Feb. 11, 1930. T. R. PALMER 1,746,961
RUBBER CHECKSTRAP
Filed Jan. 28, 1924
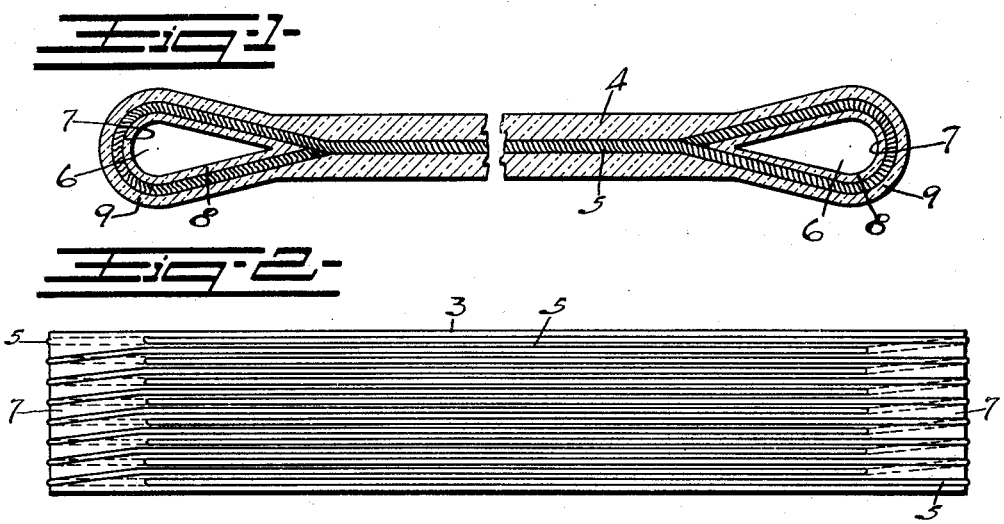
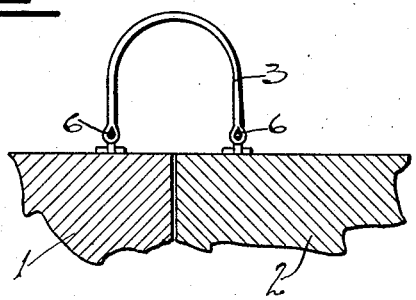

Patented Feb. 11, 1930

1,746,961

UNITED STATES PATENT OFFICE

THERON R. PALMER, OF ERIE, PENNSYLVANIA

RUBBER CHECKSTRAP

Application filed January 28, 1924. Serial No. 689,154.

This invention is designed to improve check straps ordinarily used for limiting the movement of swinging doors. In carrying out the invention I prefer to use rubber reenforced by a continuous band which extends through the body of the strap and around eyes formed in the ends of the strap.

The invention is illustrated in the accompanying drawings as follows:—

Fig. 1 shows a central section through the device.

Fig. 2 a view of the re-enforcing bands as they are formed previous to placing in the mold.

Fig. 3 a horizontal section of a door with the strap in place.

1 marks the body, 2 a door, and 3 the door limiting strap as it is ordinarily used. The strap is formed of a body of rubber 4 re-enforced by a continuous cord 5 and provided with eyes 6 at each end.

In forming the strap I use cores 7 around which the cord 5 is wound. A small layer of rubber 8 is first wrapped around the core. Then the cords are wound around the cores back and forth, the cords being crossed in the center giving a figure 8 formation to the wraps. A layer of rubber 9 is then arranged around the cords 5 and the whole placed in a mold. The mold crowds the central part of the cords downwardly and forms the central part of the strap in the shape shown in Fig. 1.

While I have shown and prefer to use a fibre cord I do not wish to be limited to a re-enforcing band formed of fibre.

What I claim as new is:—

A rubber strap having eyes vulcanized in its ends and a continuous re-enforcing cord extending around the eyes and back and forth between the eyes and crossing between the eyes in figure 8 conformation.

In testimony whereof I have hereunto set my hand.

THERON R. PALMER.